United States Patent [19]

Hull et al.

[11] Patent Number: 4,555,253
[45] Date of Patent: Nov. 26, 1985

[54] GAS-LIQUID VORTEX SEPARATOR-ELIMINATOR

[75] Inventors: Robert Hull, Warwick, R.I.; Joseph A. Lane, Taunton, Mass.

[73] Assignee: Amtrol, Inc., West Warwick, R.I.

[21] Appl. No.: 606,634

[22] Filed: May 3, 1984

Related U.S. Application Data

[63] Continuation of Ser. No. 460,056, Jan. 21, 1983, Pat. No. 4,475,932.

[51] Int. Cl.$^4$ .............................................. B01D 19/00
[52] U.S. Cl. ....................................... 55/170; 55/204; 55/459 R; 210/188
[58] Field of Search ...................... 55/39, 52, 159, 169, 55/170, 203–208, 459 R, 460; 122/406 R, 488, 489; 210/188; 237/59, 62, 63, 65

[56] References Cited

U.S. PATENT DOCUMENTS

| | | | |
|---|---|---|---|
| 1,440,808 | 1/1923 | Wineman | 55/205 |
| 1,734,507 | 11/1929 | Westling et al. | 55/52 |
| 1,737,680 | 12/1929 | Pinkham | 55/204 |
| 1,952,475 | 3/1934 | Tidd | 237/59 |
| 2,061,605 | 11/1936 | Yoder | 237/63 |
| 2,082,717 | 6/1937 | Parker et al. | 55/206 X |
| 2,323,525 | 7/1943 | Ebel et al. | 55/205 |
| 2,434,596 | 1/1948 | Spieth | 55/205 X |

(List continued on next page.)

FOREIGN PATENT DOCUMENTS

| | | | |
|---|---|---|---|
| 0018168 | 10/1980 | European Pat. Off. | |
| 687966 | 2/1940 | Fed. Rep. of Germany | 55/205 |
| 1205253 | 11/1965 | Fed. Rep. of Germany | |
| 2316885 | 4/1973 | Fed. Rep. of Germany | 55/159 |
| 58290 | 10/1967 | German Democratic Rep. | 55/204 |
| 64148 | 5/1980 | Japan | 55/205 |
| 120745 | 6/1926 | Switzerland | 237/63 |
| 188822 | 1/1936 | Switzerland | 237/63 |
| 965988 | 8/1964 | United Kingdom | 55/460 |
| 566604 | 7/1977 | U.S.S.R. | 55/205 |

OTHER PUBLICATIONS

Pompei, Fransesco, "Air In Hydronic Systems: How Henry's Law Tells Us What Happens" ASHRAE Transactions 1981, vol. 87, Pt. 1, 16 pages.
American Air Purgers, Amtrol Inc., Form RHP-12-11-0-2.
Technical Bulletin 8-80 Pressurization and Air Elimination System, Amtrol Inc., Form HVAC 13-80.
American Float Type Air Vents, Amtrol Inc., Form RHP-12-110-1.
Tangential Type Air Separator For Air Elimination, Amtrol Inc., Form 501-81A.
Model No. 720 Air Eliminator, Thrush Amtrol Inc., Bulletin 720-1 (Nov., 1979).

*Primary Examiner*—Robert Spitzer
*Attorney, Agent, or Firm*—Fisher, Christen & Sabol

[57] ABSTRACT

A gas-liquid vortex separator-eliminator which is adapted to be connected in a closed liquid circulating system having supply and return lines including a circulating pump connected therein for circulating liquid in the circulating system. The upright main body of the devise has an upper chamber and a lower chamber. The upper chamber and lower chambers are separated by a horizontal wall that has a gas discharge port in the center thereof. The inlet has a longitudinal axis which is generally perpendicular to the vertical axis of the upright main body. The inlet has a short pipe leg connected to the upper portion of lower chamber. The outlet has a longitudinal axis which is generally perpendicular to the vertical axis of the main body and which is generally parallel to the longitudinal axis of the inlet. The outlet is positioned in the lower portion of the chamber. When the separator-eliminator is in operation, liquid enters the inlet and exits through the outlet, the flow of the liquid in lower chamber producing a vortex whereby gas in the liquid is released in the form of bubbles. The liquid-exit outlet is located below where the bubbles form and/or where gas bubbles entrained in the liquid are carried by the vortex. The gas bubbles rise into the upper chamber and are purged into the atmosphere by means of the air eliminator.

17 Claims, 17 Drawing Figures

U.S. PATENT DOCUMENTS

| | | | |
|---|---|---|---|
| 2,578,568 | 12/1951 | Mayer et al. | 55/205 |
| 2,590,754 | 3/1952 | Cline | 55/204 |
| 2,611,446 | 9/1952 | Kennedy et al. | 55/206 |
| 2,710,664 | 6/1955 | Blackmore et al. | 237/63 X |
| 2,713,973 | 7/1955 | Hencken et al. | 237/63 |
| 2,735,622 | 2/1956 | Pintarelli | 237/63 |
| 2,762,451 | 9/1956 | McNeil | 55/204 |
| 2,790,606 | 4/1957 | Morgan et al. | 237/63 |
| 2,811,219 | 10/1957 | Wenzl | 55/204 X |
| 2,849,016 | 4/1955 | Nations | |
| 2,878,889 | 3/1959 | Gilbert | 55/204 |
| 2,913,068 | 11/1959 | Mistarz et al. | 55/170 |
| 3,080,119 | 3/1963 | Shutkufski | 237/63 |
| 3,149,939 | 9/1964 | Larsen | 55/204 |
| 3,202,356 | 8/1965 | Gardner et al. | 237/65 X |
| 3,271,933 | 9/1966 | Harker et al. | 237/63 X |
| 3,276,187 | 10/1966 | Harker | 237/63 X |
| 3,276,188 | 10/1966 | Carlson | 55/204 |
| 3,319,913 | 5/1966 | Schoepe et al. | |
| 3,359,708 | 12/1967 | Barber | 55/205 X |
| 3,428,966 | 5/1966 | Schoepe et al. | |
| 3,429,333 | 5/1966 | Schoepe et al. | |
| 3,495,803 | 5/1966 | Schoepe et al. | |
| 3,576,199 | 3/1969 | Schoepe et al. | |
| 3,624,893 | 2/1970 | Schoepe et al. | |
| 3,626,574 | 2/1970 | Schoepe et al. | |
| 3,812,655 | 5/1974 | Bennett | 55/204 |
| 3,912,468 | 10/1975 | Tsuchiya et al. | 55/159 |
| 3,992,172 | 11/1976 | Clark | 55/427 |
| 3,996,027 | 12/1976 | Wolf | 55/36 |
| 4,053,291 | 10/1977 | Sims | 55/204 |
| 4,093,428 | 6/1978 | Swogger | 55/204 X |
| 4,282,016 | 9/1981 | Tauber et al. | 55/204 |
| 4,299,248 | 11/1981 | Becker et al. | 137/202 |
| 4,367,078 | 1/1983 | Hendrix | 55/204 X |

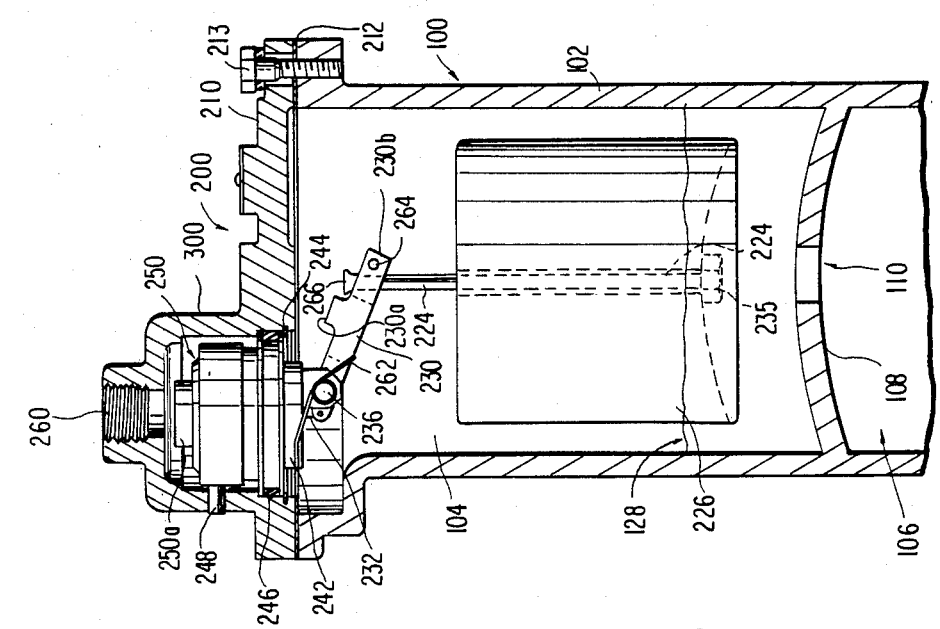
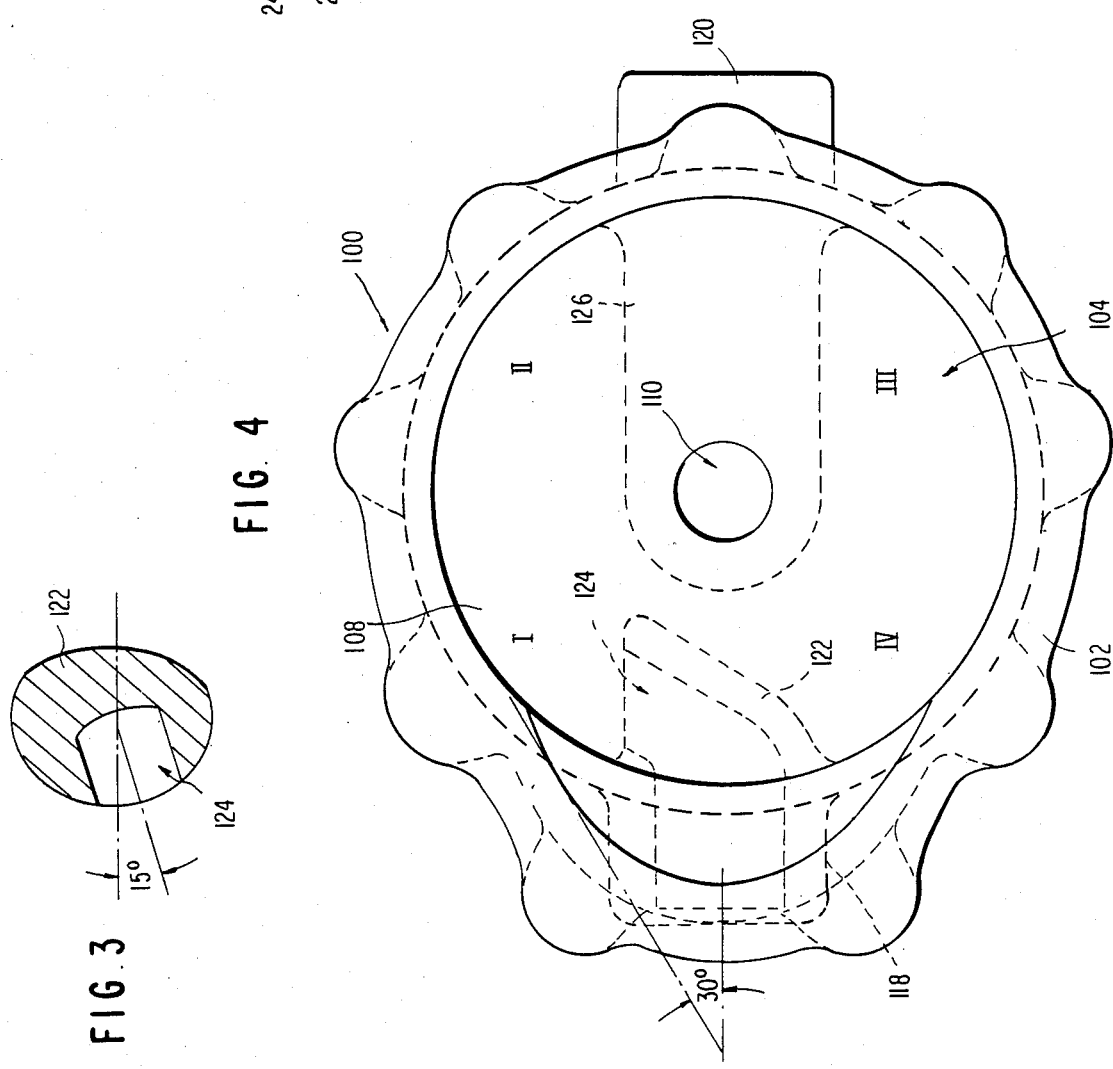
FIG. 3
FIG. 4
FIG. 5

GAS-LIQUID VORTEX SEPARATOR-ELIMINATOR

This is a continuation of application Ser. No. 460,056, filed on Jan. 21, 1983, now U.S. Pat. No. 4,475,932.

BACKGROUND OF THE INVENTION

1. Field of this Invention

This invention relates to a gas-liquid vortex separator-eliminator for removing gas present (i.e., entrained or dissolved) in the liquid in a forced-liquid circulatory system. This invention also relates to a system which has means for removing gas from a circulating liquid.

2. Prior Art

Numerous deaerating apparatus and systems are known for removing air from circulating water systems. For example, see the deaerating apparatus of U.S. Pat. No. 2,590,754 which uses a centrifugal gas and liquid separator to create a vortex in the liquid rotating in such separator. The separated air is removed from the deaerator via a vertical tube in the top of the deaerator. Such type of deaerating apparatus is known as the vortex-type of deaerating apparatus.

U.S. Pat. No. 3,276,188 shows a heating water-circulating system which has a loop composed of a boiler, a pump and a radiator, in that order in the water flow sequence. Vortex-type separating device 15 is located in the line between the outlet of the boiler and in inlet (suction side) of the pump. Air elimination of such separation is achieved by top line 16 and compression tank 17. U.S. Pat. No. 2,578,568 shows a heating water-circulating system which is similar in arrangement except that the pump is located after the boiler.

U.S. Pat. No. 4,299,248 teaches an air vent device for automatically venting entrapped air from hot water heating and chilled water cooling systems. The device can vent a large volume of air in a relatively short time by using a large vent opening, controlled by a pilot valve operated diaphragm venting valve. The pilot valve, actuated by a spring and connected to a float, permits air pressure within the device to pass to the rear of the diaphragm valve to maintain it in a closed position during normal operation of the system. When the float drops to a predetermined position the float weight overcomes the spring force and the pilot valve vents the rear side of the diaphragm valve to atmosphere, allowing it to open, thereby venting the air collected in the device to atmosphere.

BROAD DESCRIPTION OF THIS INVENTION

An object of this invention is to provide an improved gas-liquid vortex separator-eliminator for removing gas present, that is, entrained or dissolved, in the liquid in a forced-liquid circulatory system. Another object of this invention is to provide a forced-liquid flow, circulatory system which has improved means for removing gas from the liquid. A further object is to provide means for effectively separating a gas, such as, air, from a liquid, such as, water, at a cost much lower that with prior art devices and methods. A still further object of this invention is to provide an improved gas-liquid vortex separator-eliminator that can be used to replace much larger prior art air separators. Another object of this invention is to provide an improved gas-liquid vortex separator-eliminator which, compared to prior art devices, has a smaller size, such being a definite advantage for installation in finished spaces or ceiling crawl spaces, has a lower weight that is easier to support by the piping, has a lower cost (unit cost), and has a lower installation cost, that is, only two connections to the piping. Another object of this invention is to provide a forced-liquid flow, circulatory system which has improved means for removing gas from the liquid. Another object is to provide means for effectively separating a gas, such as, air, from a liquid, such as, water, at a much reduced cost than with prior art devices and methods. Another object is to provide a gas-liquid vortex separator-eliminator which is designed to provide tangential liquid motion inside of the separator portion with the liquid flow entrance and exit piping on the same central line or axis. Other objects and advantages of this invention are set out herein or are obvious herefrom to one ordinarily skilled in the art.

The objects and advantages of this invention are achieved by the improved gas-liquid vortex separator of the invention and the system of this invention.

This invention involves a gas-liquid vortex separator-eliminator, which is adapted to be connected into a closed liquid circulating system having supply and return lines including a circulating pump connected therein for circulating liquid in said circulating system. The gas-liquid vortex separator-eliminator includes an upright main body which has an upper chamber and a lower chamber. The upper chamber and the lower chamber are separated by a horizontal wall that has a gas discharge port in the center thereof. In one preferred embodiment, there is an inlet which has a horizontal axis which generally perpendicularly intersects the vertical axis of the upright main body. The inlet has an integral diffuser positioned immediately inside of the lower chamber. The diffuser is affixed at a horizontal angle within the first quadrant of the lower chamber and at a vertical angle to the horizontal axis of the inlet. There is an outlet which has a horizontal axis which generally is aligned on the horizontal axis of the inlet and which generally perpendicularly intersects the vertical axis of the upright main body. The outlet has a vertical pipe leg positioned inside of the lower chamber so that the lower segment thereof is positioned in the lower portion of the lower chamber and that the vertical axis of the lower segment of the vertical pipe leg is generally aligned on the vertical axis of the upright main body. When the separator-eliminator is in operation, the liquid enters the inlet, is directed into the lower chamber and exits via the vertical pipe leg and outlet. The horizontal angle and the vertical angle are of sufficient degree from the vertical axis of the outlet to force the water tangentially against the side of the lower chamber and downwardly in the lower chamber, respectively, so as to form a water vortex only in the lower chamber whereby the gas in the liquid is released in the form of bubbles. The lower end of the horizontal pipe leg is below where the bubbles form or where gas bubbles entrained in the liquid are carried by the vortex. The horizontal separating wall is positioned in the upright main body at a level to prevent the tangential fluid motion in the lower chamber from interfering with the passage of gas bubbles up into the upper chamber. The upper chamber contains an air eliminator. The gas bubbles rise into the upper chamber and are purged into the atmosphere by means of the air vent/eliminator. The liquid is present during operation in both the lower and upper chambers.

In another preferred embodiment of the gas liquid vortex separator-eliminator there is an upright main body which has an upper chamber and a lower chamber. The upper chamber and the lower chamber are separated by a horizontal wall that has a gas discharge port in the center thereof. There is an inlet which has a longitudinal axis which is generally perpendicular to the vertical axis of the upright main body. The inlet has a short pipe leg connected to the upper portion of the lower chamber and an outlet. The outlet has a longitudinal axis which is generally perpendicular to the vertical axis of the main body and is generally parallel to the longitudinal axis of the inlet. The outlet is positioned in the lower portion of lower chamber. An air eliminator/vent is located in the upper chamber. When the separator-eliminator is in operation, liquid enters the inlet and exits through the outlet. The flow of the liquid in the lower chamber produces a vortex whereby gas in the liquid is released in the form of bubbles. The liquid-exit outlet is below where the bubbles form and/or where gas bubbles entrained in the liquid are carried down to by the vortex. The gas bubbles rise into the upper chamber and are purged into the atmosphere by means of the air eliminator.

Liquid circulating systems can have gas or gases present in such liquid. The gas, e.g., air, can be entrained (i.e., in bubble form) in the liquid, e.g., water, or can be dissolved (e.g., in solution or laminar form) in the liquid, e.g., water. This invention covers removal of entrained gas, dissolved gas, or gas present from the liquid.

The gas-liquid vortex separator-eliminator is preferably used to separate dissolved or entrained air from water in a hot-water or chilled water circulatory system. The invention separator, for example, is a tangential, in-line or off-set separator which utilizes a vortex air pattern to create a core of lighter air bubbles and water in the lower chamber. The reduced velocity allows the air to rise to the top of the main body to be vented. Air-bearing water is discharged under pressure (has a flow velocity) from the inlet in a manner which causes the air-water mixture to move spirally within the lower chamber of the separator to effect separation of the air from the water by centrifugal force and by buoyancy.

In the tangential embodiment, the vertical axis of the short leg of the inlet is at a fixed predetermined angle, to the vertical axis of the inlet to assure that the incoming water flow is tangential to the wall of the lower chamber which assures that a vortex is created. The incoming water should strike the lower chamber wall in the first (northwest) quadrant of the horizontal plane formed by the intersection of the horizontal axis of the inlet and a horizontal axis perpendicular thereto, the intersection laying on the vertical axis of the main chamber. The separated air exits out of an opening in the top of the separator. The water exits out of the outlet pipe of the separator.

Preferably the horizontal separating wall is concavely shaped in the direction towards the upper chamber. The horizontal separating wall can be flat or have any shape which slopes upwards from the outside run to the central aperture therein. For example, the horizontal separating wall can have the shape of an upright truncated cone with the truncation being caused by the central hole. The outer rim of the horizontal separator wall should not extend inwardly at an angle below the horizontal (90°) or else air may be trapped thereby in the lower chamber.

The gas-liquid vortex separator-eliminator of this invention has a different structure than prior art vortex separators and provides more efficient gas-separation results. The downwards arm of the exit pipe is located below where gas bubbles form in the vortex.

The air-gas vortex separator-eliminator uses the intermittent automatic venting (preferred) of an air vent-eliminator mounted on top of it as an integral part of the separator body which has inline piping and upper and lower chambers.

In operation, in the first described embodiment, the liquid enters the lower chamber of the vortex separator via an orifice that is angled to direct the flow in a circular pattern around the periphery so as to create a vortex in the center. The orifice angle is such as to direct the flow into the first quadrant of the diameter of the lower chamber. As the entrained air in the liquid enters the lower chamber, the heavier liquid is forced to the outer periphery and a vortex is formed in the center consisting of the existing entrained air. Due to the low chamber velocity, the air is allowed to gravitate into the upper chamber via a hole in the separating baffle. The height of the baffle above the connection centerline must be maintained at a minimum distance in order to prevent a wiping action from taking place due to the circular motion desired in the lower chamber. To prevent circular motion in the upper chamber, the outer circumference of the baffle must be sealed. As the air accumulates in the upper chamber, the float drops expelling the air from the chamber. In the lower chamber, the cone-shaped vortex extends down almost to the end of the dip tube. The maximum effective flow relative to the height between the connector centerline to the dip tube opening is critical. Flows beyond the maximum recommended will allow some air to escape into the system. At or below the maximum flow only liquid will return to the system.

The other described embodiments also provide vortex action.

The present state of the art requires that the air separator-eliminator be designed with the connectors offset to the outer periphery in order to obtain tangential velocities. Some of the invention designs have the connectors inline. For example an orifice at an angle to cause motion tangential to the cylindrical wall of the body has been incorporated as a feature of the inlet connector.

A dip tube can be hermetically sealed to the outlet connector. The height between the connector centerline and the bottom of the dip tube is controlled by the maximum velocity, the orifice size and the chamber diameter.

Preferably the separator has dimensions to handle a flow of 4 gpm to 8 gpm. Modifying the design for higher flows requires changing one or more of the following:
 (1) the inlet and outlet connector size;
 (2) the orifice size;
 (3) the chamber diameter;
 (4) the distance between the connector centerline and the bottom of the dip tube.

This invention involves a forced-liquid flow, circulatory system for removing gas from the liquid using the improved gas-liquid vortex separator-eliminator of this invention. Normally a closed circulatory system is involved. The system includes a circulatory liquid-flow network and means for forcing the liquid to flow through the circulatory network. A by-pass line is preferably positioned around the region where the lowest gas solubility in the liquid occurs in the circulatory network. In a less preferred embodiment the by-pass line can be positioned around or in the region where a low liquid pressure (but not the lowest liquid pressure) occurs in the circulatory system. The improved gas-liquid vortex separator-eliminator is located in the by-pass line. The vortex separator separates gas from the liquid, and the air vent/eliminator continuously or intermittently expels the gas from the circulatory network. This invention provides considerable economical advantages and cost reductions over the prior art systems. Oxygen-caused corrosion in the water systems is virtually eliminated. A small air separator can be used in place of the normally very large air separators. The smaller size is definitely a plus for installation in finished spaces or ceiling crawl spaces. The invention device has a lower weight than prior art devices, which makes it easier to be supported by piping, has a lower cost (unit cost), and has a lower installation cost, which needs only two connections to the piping.

The gas can be entrained or dissolved in the liquid and/or can be present in the liquid in the form of gas bubbles. In hot or chilled water systems, after the start up or fill up periods, the air is mostly present in the water in dissolved form.

The circulatory system of this invention operates by taking full advantage of the physical process of air behavior in water (or other gas or liquid), as described by Henry's Law. This law can be expressed as:

$$X = (P_T - P_V)/(H)$$

wherein $P_T$ is the total pressure, $P_V$ is the vapor pressure,

H is Henry's law constant, and

X is the maximum quantity of gas held in solution.

The circulatory system of this invention takes advantage of two important implications of this law. First, the point of lowest solubility, i.e., lowest X, is the optimum location for the air separating/eliminating device. Second, all other locations in the piping, by definition, have water with a higher X, i.e., the water will dissolve any additional air in the piping. The circulating water acts as a "sponge" to adsorb all air elsewhere in the piping and transport it, in solution, to the point of lowest solubility, where it is ultimately released from solution and vented.

Commonly, the point of lowest solubility, maximum X, is at the location of lowest pressure and highest temperature. The temperature effect is governed by the variation of $P_V$ and H, both of which vary with temperature such that X is reduced with temperature increase. On a practical basis, however, the pressure effect is dominate.

The circulatory system of this invention includes a closed piping system where the circulatory network is a cold or hot water piping system, the flow-forcing means is a pump, the entrance and exit of the by-pass line at a space interval are communicatingly located before the outlet of the pump and after the inlet of the pump, respectively, and the improved gas-liquid vortex separator-eliminator of this invention is located in the by-pass line. This arrangement is applied when the lowest gas solubility occurs in the piping system, in this case, just before the pump inlet.

The circulatory system of this invention also includes a closed hydronic system where the circulatory network is a cold or hot water pipe system, at least one radiator (or heat exchange device using water) is present in the circulatory network, water-heating means is present in the circulatory network before the radiator or radiators, and the flow-forcing means is a pump. The entrance and exit of the by-pass line at a spaced interval are communicatingly located before the inlet of the radiator and after the outlet of the radiator, respectively. The improved gas-liquid vortex separator-eliminator of this invention is located in the by-pass line. This is the most preferred arrangement when the lowest solubility occurs at a radiator, for example, in a hot water system.

The circulatory system can be, for example, a hot water heating system or a cold water cooling system.

The liquid used in the system of this invention is normally water, but can be other liquids such as ethylene glycol. The gas in the liquid treated by the system of this invention is normally air, but can be other gases, such as, oxygen, nitrogen, methane, carbon dioxide and water vapor.

The improved system of this invention is efficient and effective in separating the gas from the circulating liquid, at minimum cost. Prior systems have employed full pipe size air separators as described in U.S. Pat. No. 3,276,188, and not necessarily at the correct location on the main line, i.e., the point of lowest solubility. Therefore, the improved system of utilizing a by-pass method, at the proper location, provides for both more effective gas removal and lower cost. For example, the full piping size for fluid circulation at the pump might be 8 inches, requiring an 8 inch pipe size separator by earlier methods. With the subject invention a one inch pipe size separator will be sufficient and will provide improved air removal.

The gas-liquid vortex separator-eliminator and overall system of this invention provide considerable economical advantages and cost reductions over prior art systems. Oxygen-caused corrosion in the water systems is virtually eliminated. A small air separator-eliminator can be used in place of the normally very large air separators.

SHORT DESCRIPTION OF THE DRAWINGS

In the drawings:

FIGS. 1a and 1b together form FIG. 1, which is a side cross-sectional view of one of the preferred air-water vortex separator-eliminators of this invention; FIG. 1a is the bottom chamber of FIG. 1; and FIG. 1b is the top chamber of FIG. 1 with the diaphragm venting valve in a closed position.

FIG. 3 is a cross-sectional view of the inlet pipe along line 3—3 in FIG. 2;

FIG. 4 is a top elevational view of the air-water vortex separator-eliminator of FIG. 1 without the air eliminator portion being present;

FIG. 5 is a cross-sectional view of the air vent device of FIG. 1 with the diaphragm venting valve in an open position;

DETAILED DESCRIPTION OF THIS INVENTION

Figure 1A:
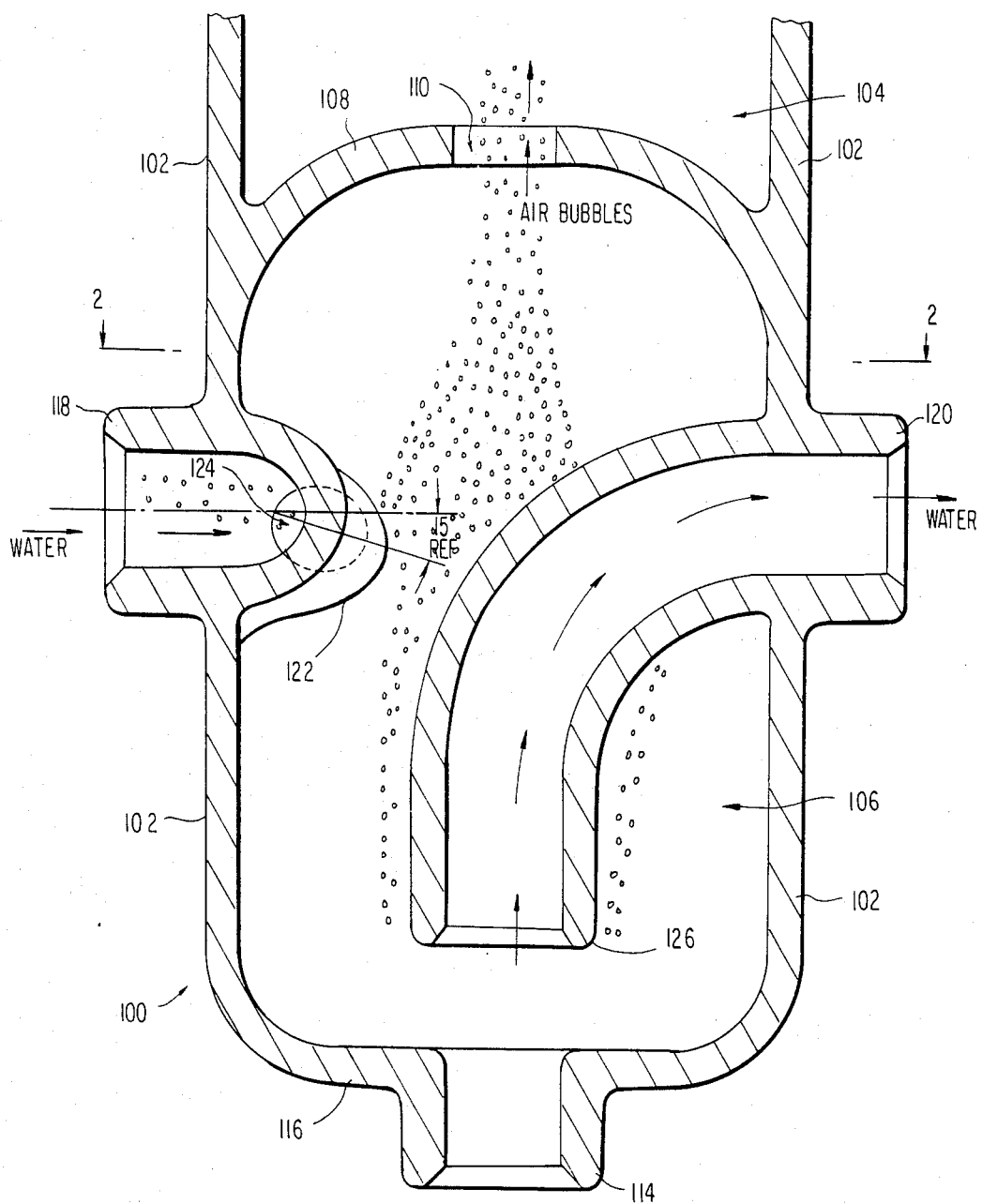
Figure 1B:
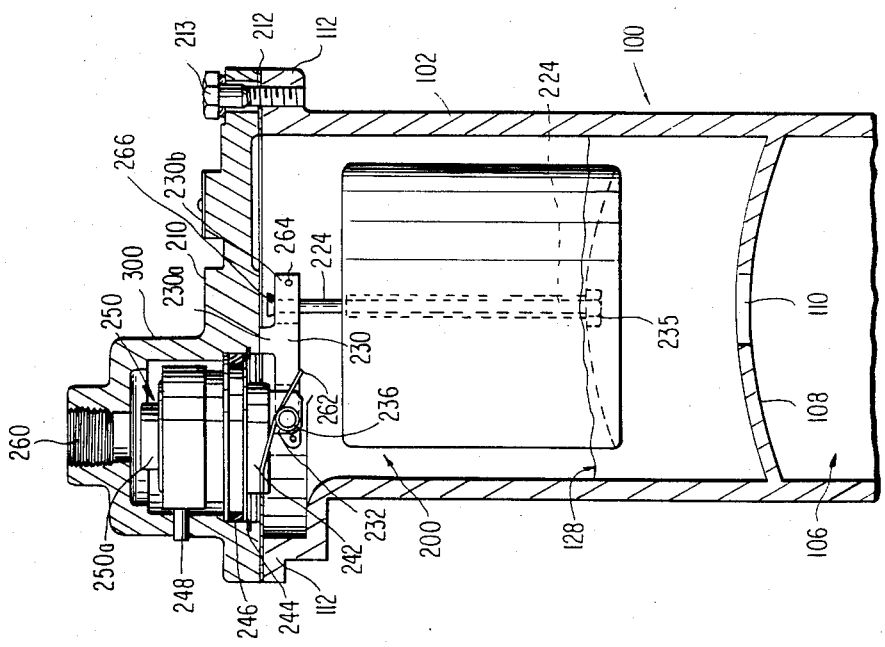

In FIG. 1 air-water vortex separator-eliminator 100 is shown in an operating mode. Air-water vortex separator-eliminator 100 includes generally cylindrical shell 102, which is divided into upper chamber 104 and lower chamber 106 by means of wall 108. FIG. 1 is divided into FIG. 1a, which shows lower chamber 106 of separator-eliminator 100, and into FIG. 1b, which shows upper chamber 104. Referring to FIG. 1b, air escapes out of lower chamber 106 through central hole 110 in separating wall 108 into upper chamber 104. The escaping air is collected and/or held in the upper part of upper chamber 104 until it is continuously or intermittently vented by air eliminator 200 which is mounted in upper chamber 104, with part of the mechanism thereof extending above upper rim 112. The details and operation of air eliminator 200 is described in detail below.

Referring to FIG. 1a, short bottom conduit 114 is located in bottom 116 of separator-eliminator 100 and is normally closed or plugged as it mainly serves as drainage for lower chamber 106. Bottom conduit 114 is usually internally threaded to receive a threaded plug.

Figure 2:
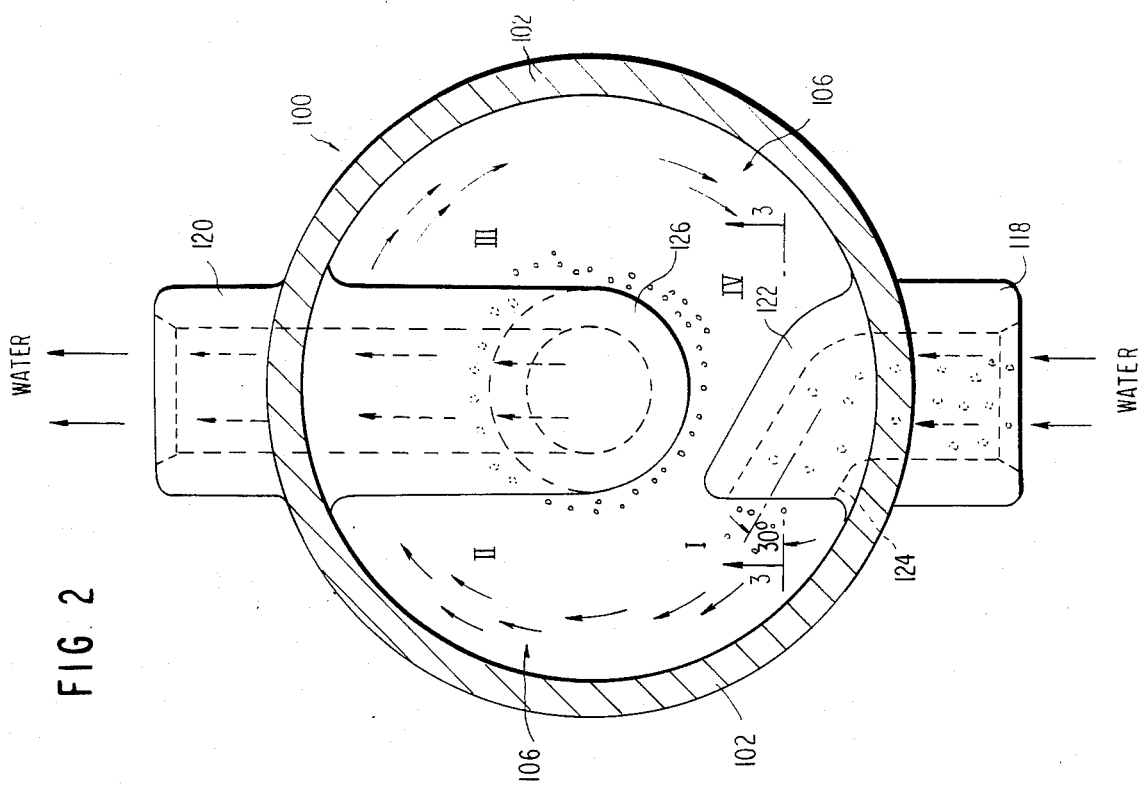
FIG. 2 is a top cross-sectional view of the air-water vortex separator-eliminator of FIG. 1 along line 2—2 in FIG. 1.

Inlet pipe 118 is in-line with outlet pipe 120, that is they, are horizontally aligned on the same horizontal axis which perpendicularly intersects the vertical or longitudinal axis of cylindrical shell 102. Water with dissolved or entrained air enters inlet 118 and continues at an angle through integral diffuser 122 into lower chamber 106. Inlet 118 and integral diffuser 122 form a distorted, wide-angle L (conduit). The longitudinal axis of integral diffuser 122 (short conduit 124) is set at an angle of 30 degrees to a line perpendicular to the horizontal axis of inlet 118 (or of 60 degrees to the horizontal axis of inlet 118). See FIG. 2. The pressurized water flow exiting integral diffuser 122 is at tangent to the inner wall of lower chamber 106, striking the inner wall within the first quadrant of lower chamber 106. Roman numerals I to IV in FIG. 2 designate the four quadrants, with I being the first quadrant. To repeat, in operation, the liquid enters lower chamber 106 via an inlet orifice 122 that is angled to direct the flow in a circular pattern around the periphery, creating a vortex in the center. The inlet orifice angle is such as to divert the flow within the first quadrant of the diameter of lower chamber 106. The longitudinal axis of conduit 124 also is at an angle of 15 degrees below the horizontal axis of inlet 118 so as to direct the circuitous or vortex flow of the entering water in a downwards direction. See FIGS. 1a and 3. Air bubbles are present as entrained air in the circulating water or air bubble form from air dissolved in the circulating water. The air bubbles collect in the low pressure of the vortex and rise to the top for collection and removal. A water flow of about 0.5 to about one foot per second is preferred as such best allows the air bubbles to separate and rise. As the water flow through separator-eliminator 100 increases, good air removal effectiveness percentages of air removal are obtained up through a water flow rate of about 6 feet per second. The water motion should be laminar upon entering separator-eliminator 100, which is the reason why a minimum straight run of pipe length equivalent to 10 pipe diameters coming into inlet 118 is preferred. On the downstream side, a minimum length equal to 5 pipe diameters upon exiting outlet 120 is preferred.

Figure 8:
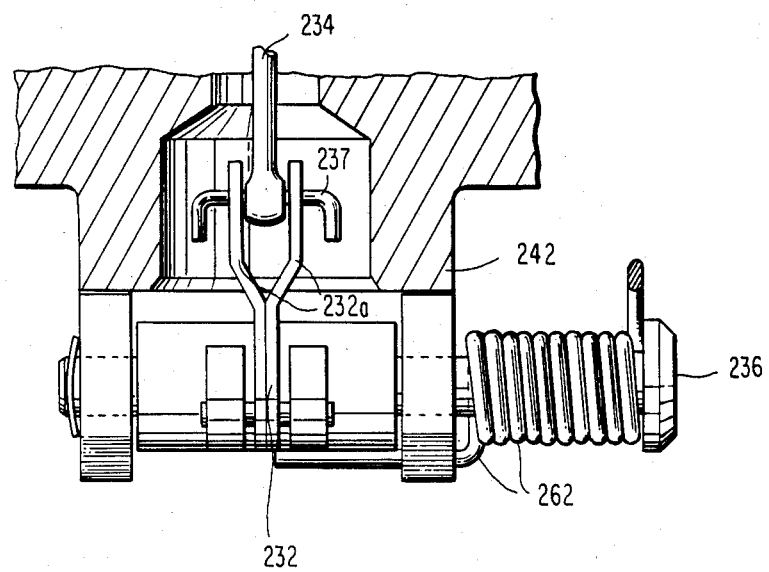
FIG. 8 is an enlarged cross-sectional view of the attachment of the pilot valve pin of the device of FIG. 1.

The vortex flow of the water in lower chamber 106 is illustrated in FIG. 8.

Outlet 120 has vertical pipe leg 126, forming an L. Vertical pipe leg 126 is positioned inside of the lower portion of lower chamber 106 so that the vertical axis of the lower segment of vertical pipe leg 126 is below the bottom of the water vortex. In lower chamber 106, the cone-shaped vortex extends down almost to the end of dip tube 126. The maximum effective flow relative to the height between the top of shell 102 to the opening of horizontal pipe leg 126 is critical. Flows beyond the maximum recommended will allow some air to escape into the circulating system. At or below the maximum flow only liquid will return to the circulatory system. The water exiting outlet 120 is mostly without dissolved or entrained air.

As the entrained air in the liquid enters lower chamber 106, the heavier liquid is forced to the outer periphery and a vortex is formed in the center consisting of the air bubbles. Due to the low chamber velocity, the air is allowed to gravitate into the top portion of upper chamber 104, via hole 110 in baffle 108. There is no circular motion desired in upper chamber 104 and to accomplish this the outer circumference of baffle 108 must be sealed. As the air accumulates in upper chamber 104 above waterline 128 therein, the air is expelled from upper chamber 104 by means of the air eliminator.

Air in direct contact with water is absorbed and carried through the system in dissolved form (in solution). Air binding and accumulation of air bubbles in piping causes noise and inefficient operation. Oxygen causes corrosion in the system, and the presence of air in the system causes a waste of energy as regards the pump.

For air-gas vortex separator-eliminator 100 to be capable of peak air separation, a flow of 4 to 8 gpm is maintained, with inlet pipe 118 having an O.D. of $\frac{3}{4}$ or 1 inch, outlet pipe 120 having an O.D. of $\frac{3}{4}$ or 1 inch, aperture 110 having a diameter of $\frac{3}{4}$ inch, the lower end of leg 126 being $\frac{3}{4}$ inch from the bottom of bottom chamber 106, bottom chamber having a diameter of 3.89 inches, the distance from the horizontal axis of inlet 118 to the end of leg 122 being 11/16 inch, the distance from the top of baffle 108 to the top of separator-eliminator 100 being 5 1/16 inches, and the height from inside the bottom of lower chamber 106 to the top of separator-eliminator 100 being 11⅜ inch.

Figure 6:
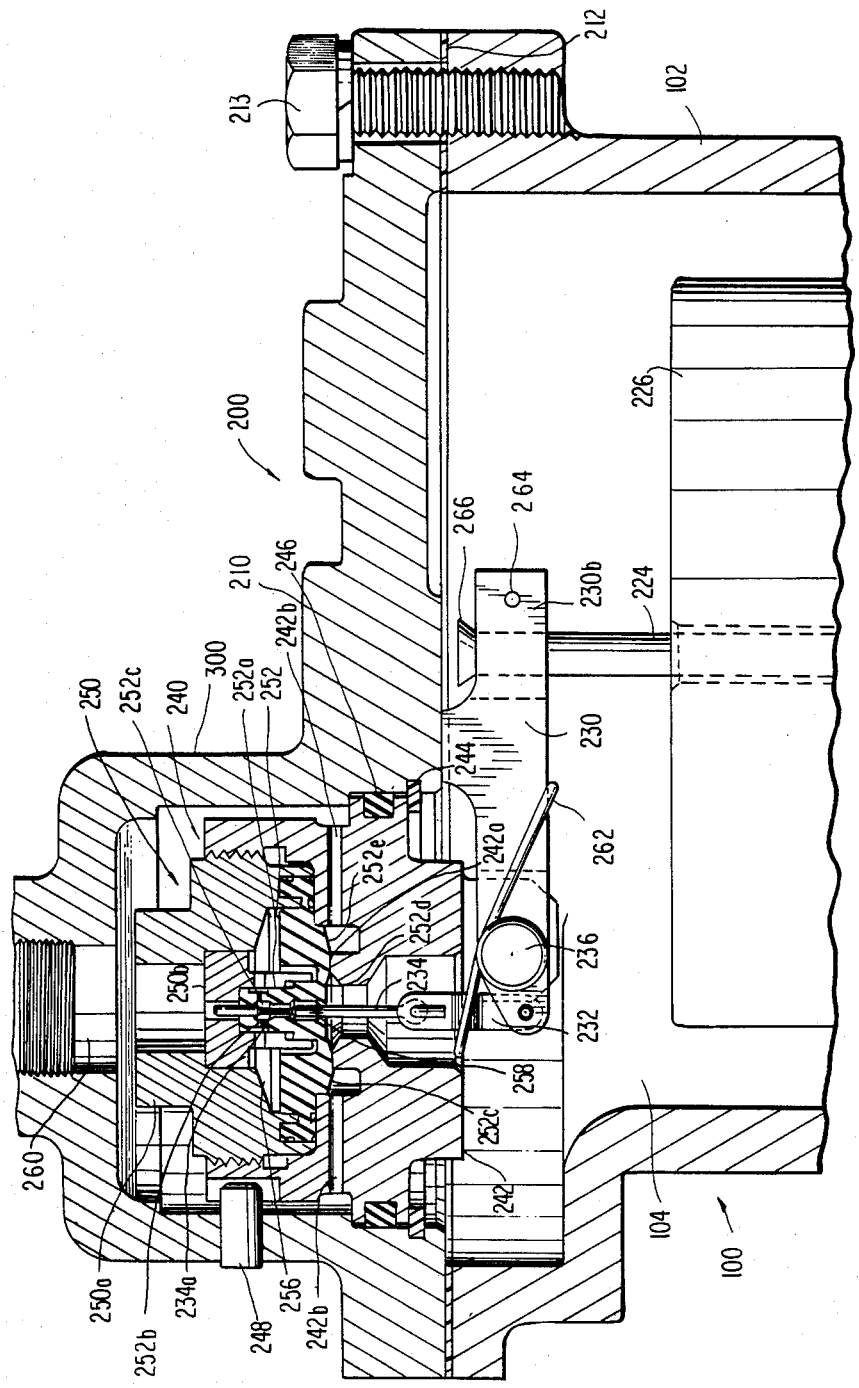
FIG. 6 is an enlarged cross-sectional view of the diaphragm venting valve of the device of FIG. 1 showing the valve in a closed position.

Referring to FIG. 1b, air vent-eliminator 200 uses the upper portion of cylindrical shell 102 as a part thereof. Housing 210 is joined together along separation line 212 with rim 112 of shell 102 by bolts, screws, or the like indicated at 213. The interior of upper chamber 104 defines a pressure chamber, which communicates with the water system through opening 110 in horizontal wall 108. Float guide rod 224 is slidably mounted in a vertical central bore through float 226 to guide the path of travel of the float. Obviously, any other method of attaching float guide rod 224 to portion 210 may be used without exceeding the scope of this invention. Float guide rod 224 extends through the central opening in float 226 such that the float may move vertically with respect to the guide rod. As shown in FIG. 1b, the bottom surface of float 226 is concave shaped. Float 226 may be a hollow metallic structure, or it may be made of plastic or any other material which will float on water and not be affected by the temperature of the water used in the system. Link 230 is pivotally connected to valve seat structure 242, to be described hereinafter, at pivot point 236 and to link 232 at its opposite end. Link 230 has expanded "U" portion 230b, with pin 264 extending between both "U" portions 230b. The upper portion of float guide rod 224 extends through the passage formed by both "U" portions 230b and pin 264. Top nob portion 266 of float guide rod 224 is shaped like an inverted, truncated one. Accordingly float 226 is free-floating in an up-and-down manner and slightly in a sideways direction within the obvious constraints of the illustrated device. This allows the device to quickly correct for fluctuations in water line pressure without experiencing any unwanted water sputtering or passage through the device. Link 232, in turn, is pivotally connected to pivot valve pin 234 as shown in detail in FIG. 8. Link 232 has expanded "U" portion 232a which extends on both sides of pilot valve pin 234 with rod 237 extending through both "U" portions and pilot valve pin 234. Obviously other means of pivotally connecting link 232 with pilot valve pin 234 may be utilized without exceeding the scope of the invention. Link 230 has stop portion 230a extending from one side which contacts upper housing portion 210 to provide an upper limit on float travel and consequently, a limit on the closing of the pilot valve, as shown in FIG. 6. The lower float position is governed by nut 235 attached to the lower threaded position of float guide rod 224.

Figure 7:
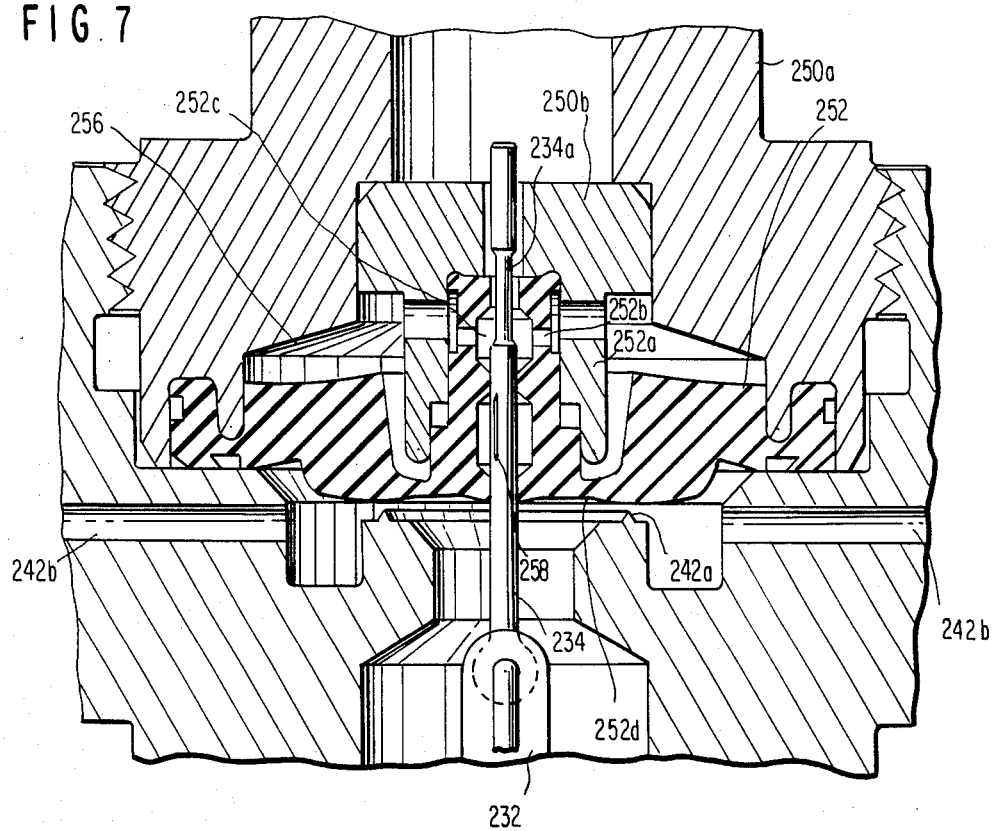
FIG. 7 is an enlarged cross-sectional view of the valve of FIG. 6 showing the valve in an open position.

The diaphragm valve structure is shown in detail in FIGS. 6 and 7. Upper housing 210 has raised portion 300 defining a cavity into which diaphragm venting valve structure 240 is placed. Diaphragm venting valve structure 240 comprises valve seat structure 242 sealingly retained in position within the cavity via snap ring 244, "O" ring seal 246, and dowel 248 inserted through the wall of upper housing portion 210. Retainer 250, comprising elements 250a and 250b, threadingly engages valve seat structure 242 and serves to retain diaphragm valve 252 in position as shown with sealing portion 252e of diaphragm 252 in sealing contact with annular valve seat 242a. The requirement for and advantage of this sealing contact in the valve in its "assembled" form are hereinafter described.

Diaphragm valve 252 is made of a resilient material which will withstand contact with the high or low temperature fluids in the water system. Valve 252 has central portion 252a with a central opening through which pilot valve pin 234 exceeds. Central portion 252a also has a plurality of radial openings 252b extending from enlarged portion 252c of the central opening. The function of radial openings 252b and enlarged portion 252c will be hereinafter described. Central portion 252a extends upwardly and sealingly contacts depending annular portion 250b of retainer 250.

Relatively thin connecting portion 252d connects central portion 252a with movable sealing portion 252e which sealingly contacts annular valve seat 242a. Connecting portion 252d allows sealing portion 252e to move away from valve seat 242a to open the valve by means which will be hereinafter described.

Sealing portion 252e of the valve 252 is maintained against valve seat 242a by action of air pressure in rear chamber 256. Air enters chamber 256 from pressure chamber 104 through a series of longitudinal or spiral slots 258 in pilot valve pin 234. Thus, when in the position of FIG. 6, pilot valve pin 234 allows air to pass from upper chamber 104, through the central opening in central portion 252a into enlarged portion 252c. The air passes through radial openings 252b, through depending portion 250b and into chamber 256. Since the air pressures are approximately equal in chambers 104 and 256, the diaphragm valve is maintained closed due to the larger effective area of diaphragm 252 facing chamber 256. Thus, regardless of the air pressure in the chambers, the diaphragm valve 252 will remain closed as long as pilot valve pin 234 is in its lower position.

As the volume of air in upper chamber 104 increases, it forces the water out of the chamber, thereby lowering float 226. Due to the linkage connecting float 226 to pilot valve pin 234, the pilot valve pin 234 moves upwardly as the float moves downwardly. When float 226 reaches a predetermined position the large diameter of pin 234 engages the middle part of central portion 252a thus cutting off communication between enlarged portion 252c (and consequently, chamber 256) and upper chamber 104. When the float lowers to another predetermined position, reduced diameter portion 234a of pilot valve pin 234 allows communication between enlarged portion 252c (and, consequently, chamber 256) and vent opening 260, thereby venting the air in chamber 256. Since the air pressure in upper chamber 104 is now greater than that in chamber 256, sealing portion 252e is moved upwardly to open the valve. Air then escapes from the air vent device through radial openings 242b, around valve seat structure 242 and through vent opening 260. The air may be allowed to vent directly out of opening 260, or a pipe may be connected so as to direct the air to a more suitable venting location.

As the volume of air within upper chamber 104 diminishes, the water level will begin to rise, causing float 226 to rise and pilot valve pin 234 to lower. Pilot valve pin 234 first reaches a position where it cuts off communication between vent opening 260 and enlarged portion 252c. Further rise in the water level causes the pilot valve pin to lower to a position where it again allows air to pass from upper chamber 104 into chamber 256. The lowering of pilot valve pin 234 to its closed position is made more positive by spiral spring 262 which assists the buoyant force exerted by float 226. The strength of spring 262 should obviously be chosen so as to not prevent float 226 from lowering when the water level drops in upper chamber 104. As the pressure in chamber 256 becomes relatively equal to that in upper chamber 104, it moves sealing portion 252e against valve seat 242a, due to the difference in effective areas, and cuts off the venting action.

As described, sealing surface 252e of diaphragm 252 is initially in sealing contact with annular valve seat 242a when the valve is in the "as assembled" form, i.e., not connected to an operating water system. The importance and advantage of this can be described by examining what would happen if this initial sealing condition were not present. During the initial filling of the system, the water level in the system and subsequently in housing upper chamber 104 will rise. If, however, sealing surface 252e were not in contact with seat 242a, air would vent through outlet 260 and no system pressure would build up. Since, as herein described, operation of the vent is controlled solely by system pressure, the vent would remain open. Water would subsequently fill upper chamber 104 and discharge through opening 260. Thus the need to have sealing surface 252e initially in contact with seat 242a is shown.

With sealing member 252e being in initial contact with seat 242a, a valve function results which has significant advantage. Frequently, during the cooling down of water systems, negative system pressures are encountered. Under such condition of reduced system pressure, the valve will not open. Reduced system pressure (below atmosphere) will allow a small quantity of air to be drawn into upper chamber 104, thus lowering the float. With the float in such float position, the pilot valve pin will be in position to expose chamber 256 to the atmosphere. This pressure will be higher than the pressure on the other side of the flexible diaphragm member, thus force sealing surface 252e against seat 242a and precluding additional air from being drawn into the system.

Air vent-eliminator 200 uses the internal air pressure to both open and close the diaphragm valve.

The pilot valve and diaphragm venting valve structure 200 are such that the air pressure within the housing acts on the front and rear sides of the diaphragm, however, the diaphragm valve is maintained in a closed position due to the larger effective area on the rear side, i.e., the side facing away from the housing. When the air volume builds up and lowers the water level within the housing, a float, mechanically connected to the pilot valve, causes the spring biased pilot valve to change its position and vent the rear side of the diaphragm to the atmosphere. The pressure acting on the front of the diaphragm then forces it open to also vent the air in the housing to the atmosphere. As the water level rises, the return spring and the float bring the pilot valve back to its original position where it closes the pilot vent, which then directs system air pressure to the rear side of the diaphragm. Due to the larger effective area, the air pressure closes the diaphragm venting valve.

Figure 9:
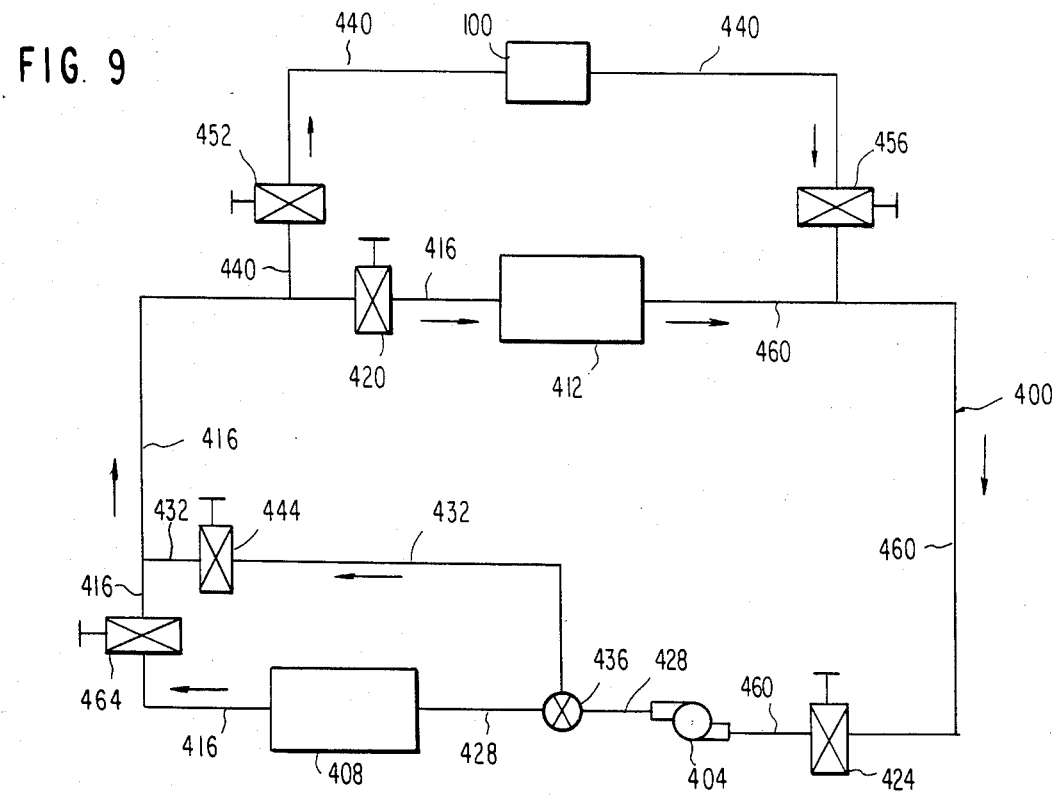
FIG. 9 is a schematic diagram of a preferred embodiment of the by-pass scheme of this invention using the air-water vortex separator-eliminator of FIG. 1.

In FIG. 9 hot-water heating system 400 includes pump 404, hot water heater 408 and radiator 412. Supply line 416 connects the outlet of hot water heater 408 with the inlet of radiator 412. Valve 420 is located in line (pipe) 416 just before radiator 412. Return line 460 connects the outlet of radiator 412 with the inlet of pump 404. Valve 424 is located in line (pipe) 460 just before pump 404. Line (pipe) 428 connects the outlet of pump 404 with hot water heater 408. By-pass line (pipe) 432 can be used to shunt all or part of the water around hot water heater 408 by means of three-way valve 436. Valve 444 is located in line 432 near line 416. Valve 464 is located in line 416 after hot water heater 408 but before the intersection with line 432.

Pump 404 can optionally be located in line 416 between boiler 408 and radiator 412, normally beyond the intersection of line 416 and by-pass line 432.

A low pressure region (i.e., low head) is normally present in system 400 in radiator 412 and the portions of pipes 416 and 460 near radiator 412. This is particularly so if the radiator is at a considerable height above hot water heater 408 (and pump 404). Such low pressure region may be the lowest pressure region in system 400 if radiator 404 is located one or more floors above hot water heater 408 (and pump 404). As shown in FIG. 9, by-pass line 440 is situated to by-pass radiator 412 (and valve 420) with its inlet connected to line 416 and its outlet connected to line 460. Air-water vortex separator-eliminator 100 is located in by-pass line 440. Valve 452 is located in line 440 before air separator-eliminator 100. Valve 456 is located in line 440 after air separator-eliminator 100.

Air-water vortex separator-eliminator 100, to be most effective, should be located at a higher elevation than radiator 412. An advantage of the air-separator by-pass system around radiator 412 is that when flow through radiator 412 is shut off by means of valve 420, the flow can be continued through by-pass line 440 with the continued separation of air from the circulating water. By choosing a low pressure area for air separator-eliminator 100, efficient and effective separation of any air from circulating water is achieved and the separated air is continuously or intermittently eliminated. When flow is allowed through radiator 412, some of the water should also be allowed to flow through by-pass line 440 to maintain constant air separation and elimination. The by-pass should always operate at a low by-pass level.

The diaphragm valve air vent device of U.S. Pat. No. 4,299,248 (Becker et al.), the pertinent portions of which are incorporated herein by reference thereto can be used as the air vent/eliminator portion of the invention air-water vortex separator-eliminator. Any other (continuous or intermittent) air eliminator can be used provided it can be incorporated into air-water vortex separator-eliminator 100. The preferred air eliminator is shown in the figures.

There can be more than one radiators 412 (parallel or in series) in heating system, but only one is shown in FIG. 9 for illustrative purposes.

Proper design of an air-free piping system includes two basic concepts:
 (a) Removal of the dominent source of air by use of a diaphragm-type tank.
 (b) Providing a reliable air separation-elimination assembly at the right location to remove residual air.

The right location for the air separation-elimination assembly is preferably always at the "point of lowest solubility" of the air in the water. Only one assembly per system is necessary so long as it is at the proper location. More than one may be used if desired, for example, one per major piping zone. If there are many risers in a building, choose the riser which is most distant from the pump, since this is where the pressure, and thus the solubility, is the lowest.

An important point to keep in mind is that the water acts as a transporter of air in solution. If air bubbles exist somewhere other than at the "point of lowest solubility", then they will be absorbed by the water. Water which has released its air at the point of the lowest solubility will absorb air everywhere else in the piping, since by definition, it has a higher solubility everywhere else. The air thus absorbed is carried in solution to the air elimination point where it is removed from the system.

The point of lowest solubility is the point of highest temperature and lowest pressure. Since temperature usually has a lesser effect than pressure, the question is simply reduced to finding the point where the pressure is lowest. The choice reduces to two: system top or system bottom at pump suction.

Since the pump effect at the top point (highest elevation) of the system is usually about one half of its head, then it follows that the pressure at the top will be lower than the pressure at the bottom if one half of the pump head is less than the elevation of the high point. This requirement can be summarized as follows:

(a) If the pump head is greater than twice the maximum elevation, then the air separation-elimination system is located at the bottom.
(b) If the pump head is less than twice the maximum elevation, then the air separation-elimination system is located at the top.

For purposes of illustrating the above method, one could use a closed hot-water circulating system which had a pump, a diaphragm-type tank, three in-parallel radiators and a hot water heater. Also for purposes of illustration, use a pump which has a 300 gpm capacity at a 40 foot head and use a maximum elevation to the top radiator of 30 feet. If the pump head is greater than twice the maximum elevation, then the air separator-eliminator combination is located at the bottom of the system. If the pump head is less than twice the elevation, then the air separator-eliminator combination is located at the top of the system. In the illustration, the forty foot head is less than twice the 30 foot maximum elevation, so the air separation-elimination combination should be located at the top (i.e., on a by-pass around the top radiator). This illustrates how to decide between a top location and a bottom location for the air separation-elimination combination.

Figure 10:
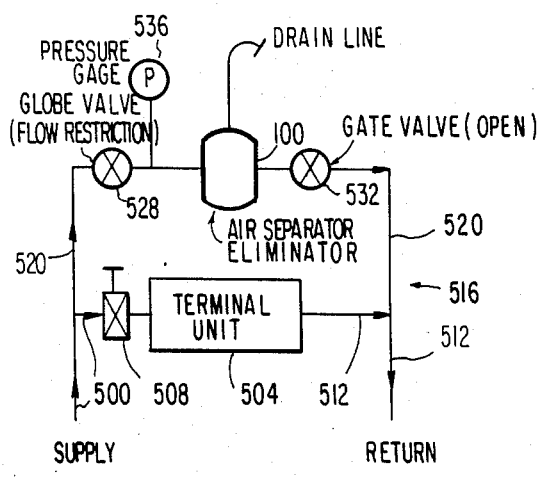
FIG. 10 is a schematic view of the by-pass scheme for a radiator.

It takes very little time (less than one hour) to get most of the air out of a hot-water heating system (closed). The top arrangement of FIG. 10 provides continuous flow at low rate. The continuous flow is important to insure an air free system. Whenever the pump(s) operate, the water circulating through the piping will scavenge any air having been admitted into the piping, and carry it to the assembly of FIG. 6. Here the air is released from solution and vented from the system.

In FIG. 10 the pump and hot-water heater are not shown. Supply line 500 connects the outlet of the hot water heater with the inlet of radiator 504. Valve 508 is located in line (pipe) 500 just before (or just after) radiator 504. Valve 508 is commonly of the automatic type which modulates the flow through radiator (heat exchanger) 504 is response to space conditioning requirements. Return line 512 connects the outlet of radiator 504 with the inlet of the pump. A low pressure region is normally present in system 516 in radiator 504 and the portions of pipes 500 and 512 near radiator 504. This is particularly so if radiator 504 is at a considerable height above the hot water heater and pump. Such low pressure region may be the lowest pressure region in the piping system if radiator 504 is located one or more floors above the pump.

As shown in FIG. 10 by-pass line 520 is situated to by-pass radiator 504 (and valve 508) with its inlet connected to supply line 500 and its outlet connected to return line 512. Air-water vortex separator-eliminator 100 is located in by-pass line 520. Valve 528 is located in line 520 before air-water vortex separator-eliminator 100. Valve 532 is located in line 520 after air-water vortex separator-eliminator 100. Pressure gauge 536 is located in line 520 between valve 528 and air-water vortex separator-eliminator 100. Valve 528 upstream of separator-eliminator 100 is partially closed such that the separator-eliminator 100 pressure is close to the return line 512 pressure. Also, this arrangement insures continuous flow even if there is a control valve in the terminal line, such as, valve 508. The flow rate required is low; it acts as a bleed by-pass, but is sufficient to deaerate the system. The valves, in addition to acting as restrictions, are necessary for isolation in the event that servicing is required.

Figure 11:
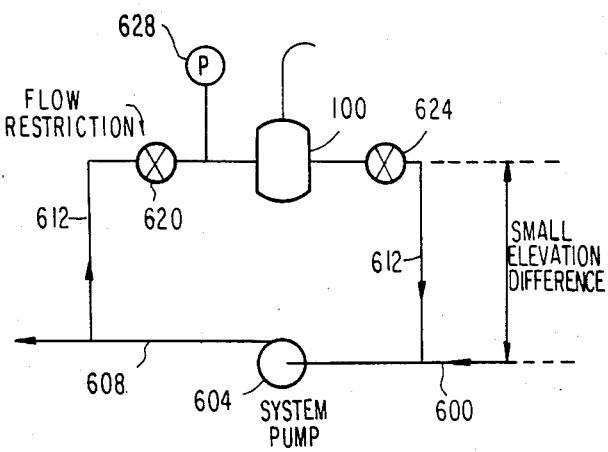
FIG. 11 is a schematic view of the by-pass scheme of this invention using the air-water vortex separator-eliminator of FIG. 1 for a pump.
Figure 12:
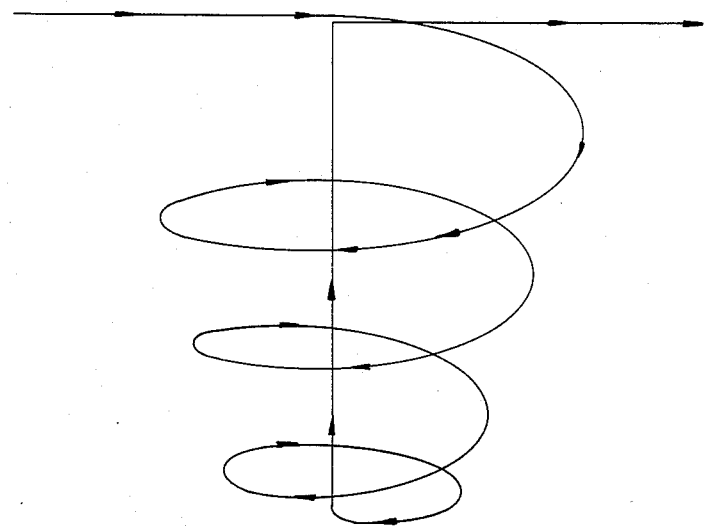
FIG. 12 is a representation of the water path in air-water vortex separator-eliminator of FIG. 1.

FIG. 11 shows a similar arrangement for an assembly at the system bottom, i.e., at the pump. The hot-water heater and radiator are not shown. Return line 600 is connected to the inlet of pump 604. Line 608 is connected to the outlet of pump 604. By-pass line 612 is situated to by-pass pump 604. Air-water vortex separator-eliminator 100 is located in by-pass line 612. Valve 620 is located in line 612 before air-water vortex separator-eliminator 100. Valve 624 is located in line 612 after air-water vortex separator-eliminator 100. Pressure gauge 628 is located in line 612 between valve 620 and air-water vortex separator-eliminator 100. Using the bleed by-pass approach, air-water vortex separator-eliminator 100 can be a very small one, even though the line size may be very large. With upstream valve 620 throttled, the separator pressure is close to the pump suction pressure. Note that there is considerable cost reduction since a small separator replaces a normally high one of full line size.

A basic reason that this by-pass approach works is that one is only handling residual air, which is possible only if a diaphragm expansion tank is used.

With non-diaphragm type compression tanks, high quantities of air can be generates by the saturated wataer in the tank, and if not immediately separated can lodge in the piping at higher elevations. With diaphragm-type tanks only a residual amount will exist, and this will be transported by the water to the appropriate location.

Dissolved oxygen combines with metallic surfaces to form oxides, which is a disadvantage of dissolved air in water. Air binding of terminal units and the accumulation of air bubbles in pipes causes noise and inefficient operation. Air cavitation causes the loss of pump efficiency. This invention greatly eliminates or alleviates such problems. Furthermore, this invention essentially eliminates corrosion caused by oxygen in the system which is a tremendous economic advantage over prior systems. This invention has several advantages over prior air-water separators and forced-liquid flow circulatory systems which provide quite significant economic advantages and savings.

Figure 13:
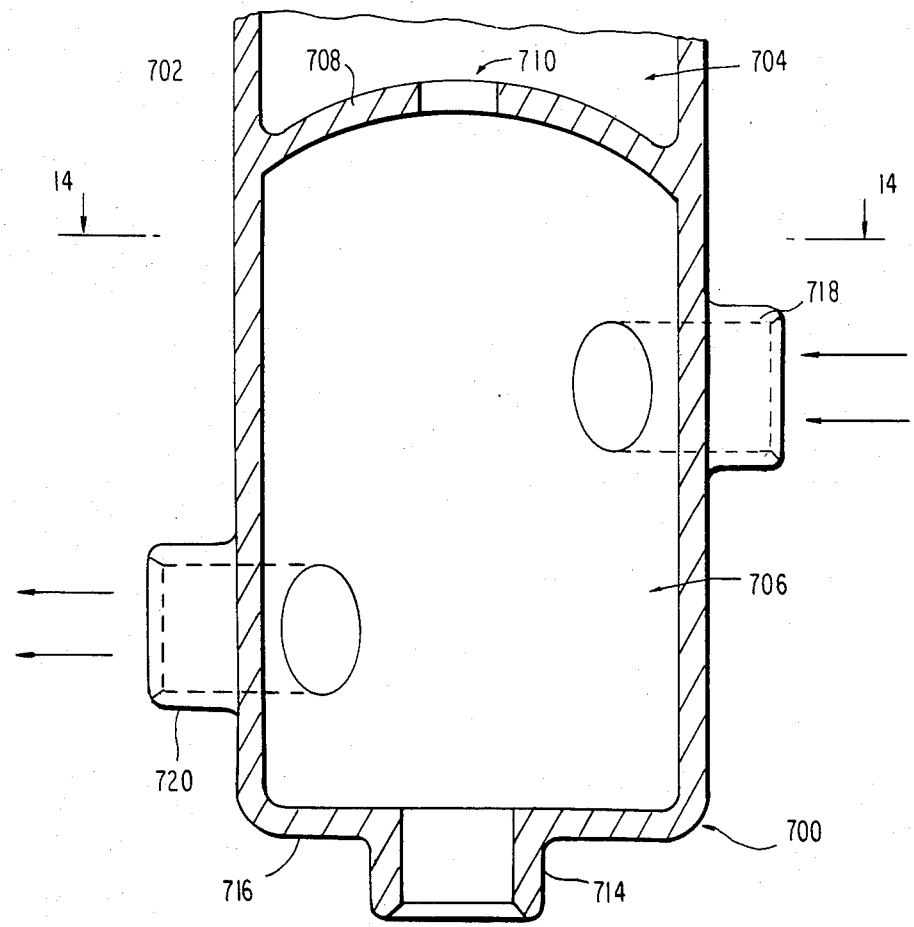
FIG. 13 is a side cross-sectional view of the air separator portion of another of the preferred air-water vortex separator-eliminators of this invention.

In FIG. 13 air-water vortex separator-eliminator 700 is shown in operating mode. Air-water vortex separator-eliminator 700 includes generally cylindrical shell 702, which is divided into upper chamber 704 and lower chamber 706 by means of wall 708. Horizontal wall 708 is concavely-shaped and contains central hole 710. Water is present in upper chamber 704 and lower chamber 706 during operation. Air escapes out of lower chamber 706 through central hole 710 in separating wall 708 into upper chamber 704. The escaping air is collected and/or held in the upper part of upper chamber 704 until it is continuously or intermittently vented by an air eliminator 200 which is mounted in upper chamber 704, with part of the mechanism thereof extending above rim 712. See above for the details and operation of air eliminator 200.

Short bottom conduit 714 is located in bottom 716 of separator 700 and is normally closed or plugged as it mainly serves as drainage for lower chamber 706. Bottom conduit 714 is usually internally threaded to receive a threaded plug.

Inlet pipe 718 is in-line with outlet pipe 720, that is they, are horizontally aligned on the same horizontal axis which perpendicularly intersects the vertical or longitudinal axis of cylindrical shell 702. Water with dissolved or entrained air enters inlet 718. The pressurized water flow exiting inlet 718 sweeps around the internal wall of lower chamber 708, creating a vortex in the center. Air bubbles are present as entrained air in the circulating water or air bubbles form from air dissolved in the circulating water. The air bubbles collect in the lower pressure of the vortex and rise to the top for collection and removal. A water flow of about 0.5 to about one foot per second is preferred as such best allows the air bubbles to form and rise. As the water flow through separator-eliminator 700 increases, good air removal effectiveness percentages of air removal are obtained up through a water flow rate of about 6 feet per second. The water motion should be laminar upon entering separator-eliminator 700, which is the reason why a minimum straight run of pipe length equivalent to 10 pipe diameters coming into inlet 718 is preferred. On the downstream side, a minimum length equal to 5 pipe diameters upon exiting outlet 720 is preferred.

In lower chamber 706, the cone-shaped vortex extends down almost to the top of outlet 720. At all times outlet 720 should be below the bottom of the vortex. Flows beyond the maximum recommended will allow some air to escape into the circulating system. At or below the maximum flow only liquid will return to the circulatory system. The water exiting outlet 720 is mostly without dissolved or entrained air.

As the entrained air in the liquid enters lower chamber 706, the heavier liquid is forced to the outer periphery and a vortex is formed in the center consisting of air bubbles. Due to the low chamber velocity, the air is allowed to gravitate into the top portion of upper chamber 704, via hole 710 in baffle 708. No circular motion is desired in upper chamber 704 and to accomplish this the outer circumference of baffle 708 must be sealed. As the air accumulates in upper chamber 704 above the water line therein, the air is expelled from upper 704 by means of the air eliminator.

Figure 14:
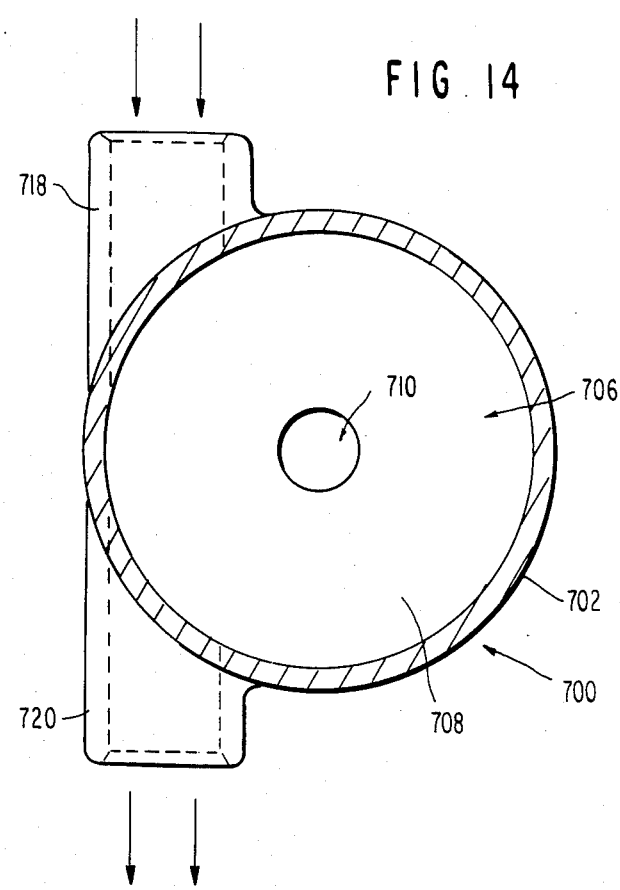
FIG. 14 is a top cross-sectional view of the air-water vortex separator of FIG. 13 along line 14—14 in FIG. 13.
Figure 15:
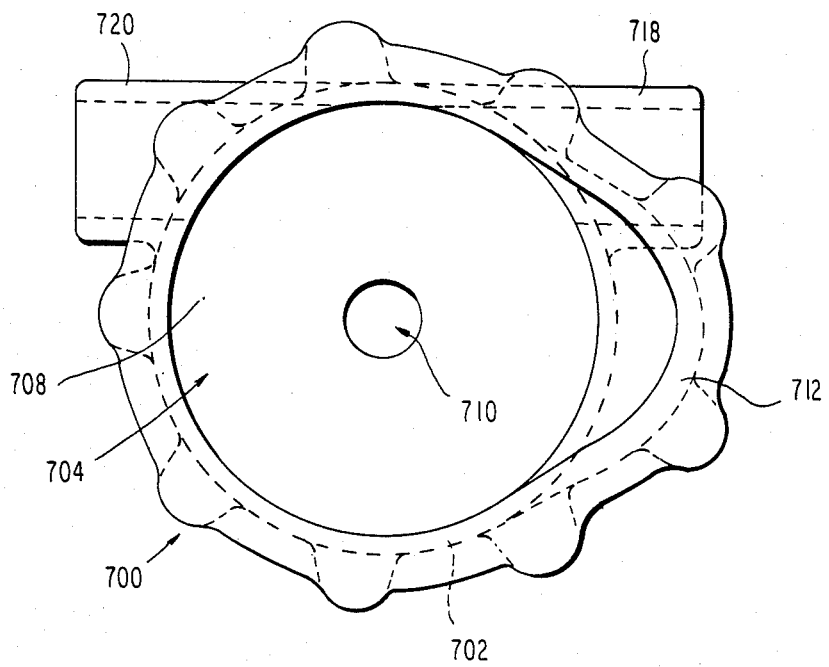
FIG. 15 is a top elevational view of the air-water vortex separator-eliminator of FIG. 13, without the air eliminator portion being present.

As a variation, inlet 718 and outlet 720 can be offset instead of being in-line as shown in FIG. 14. The invention broadly involves an integral unit combining a gas-water vortex separator and a gas eliminator.

Figure 16:
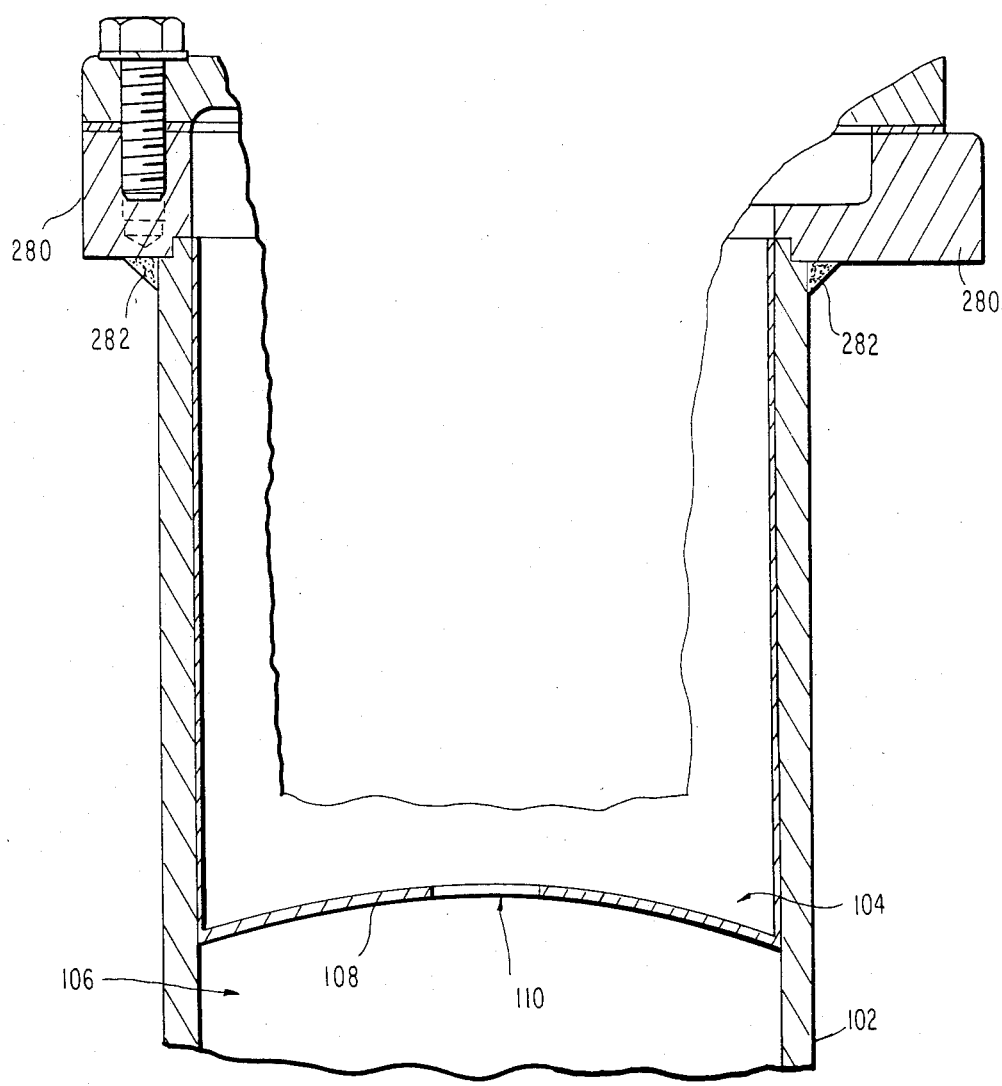
FIG. 16 is a side cross-sectional view of one version of the upper chamber of the air-water vortex separator-eliminator of this invention.

In FIG. 16, rim 112 as an integral part of shell 102 is replaced by rim portion 280 which is welded (282) to the top of shell 102. Horizontal wall 108 is affixed in shell 102 by being attached to the lower and cylindrical insert 110 which tightly fits in the upper part of shell 102.

What is claimed is:

1. A gas-liquid vortex separator-eliminator which is adapted to be connected in a closed liquid circulating system having supply and return lines including a circulating pump connected therein for circulating liquid in said circulating system, comprising (a) an upright main body which has an upper chamber (b) and a lower chamber (c), said upper chamber (b) and lower chamber (c) being separated by a horizontal wall (d) that has a gas discharge port (e) in the center thereof, (f) an inlet which has a longitudinal axis which is generally perpendicular to the vertical axis of said upright main body (a), said inlet (f) having a short pipe leg (g) connected to the upper portion of lower chamber (c), (h) an outlet, which has a longitudinal axis which is generally perpendicular to the vertical axis of main body (a) and is generally parallel to the longitudinal axis of inlet (f), said outlet (h) being positioned in the lower portion of said lower chamber (c), and (i) an air eliminator which is located in said upper chamber (b), when said separator-eliminator is in operation, liquid enters said inlet (f) and exits through said outlet (h), the flow of said liquid lower in lower chamber (c) producing a vortex whereby gas in said liquid is released in the form of bubbles, said liquid-exit outlet (h) being blow where said bubbles form and/or where gas bubbles entrained in said liquid are carried by said vortex, said gas bubbles rising into said upper chamber (b) and being purged into the atmosphere by means of said air eliminator (i), said gas vent-eliminator (i) for automatically venting entrapped gas from a liquid system having a pilot valve-operated diaphragm valve means comprising a valve seat structure containing an upwardly facing rigid valve seat member having a central aperture communicating with the interior of said upper chamber (b), a pilot valve-operated flexible diaphragm valve member having a sealing surface which faces downward and sealing engages against said rigid valve seat member, said diaphragm valve member having a central aperture, a chamber located above said flexible diaphragm member, on the side of said flexible diaphragm member opposite said sealing surface, said chamber communicating with said central aperture of said diaphragm valve member, a retaining means to position and retain said flexible diaphragm member in said valve seat structure such that said sealing surface on said flexible diaphragm member is in contact with said rigid valve member, said retaining means having a central aperture which is aligned with and communicates with said central aperture of said diaphragm valve member, and a pilot valve pin slidably located in said central aperture of said diaphragm valve member, at least one passageway being located in the lower portion of said pilot valve pin, said lower passageway being located in the lower portion of said pilot valve pin, said lower passageway allowing communication between said cavity in said upper chamber (b) and said central aperture in said diaphragm valve member when said diaphragm valve member sealingly engages said valve seat member and not being in such communication position once said lower passageway has moved entirely within said central aperture of said diaphragm valve member or when such sealing engagement does not exist, said pilot valve pin allowing communication between said chamber and said air outlet when said sealing engagement does not exist, at least one passageway or indentation being located in the upper portion of said pilot valve pin, said upper passageway or indentation allowing communication between said chamber and said air outlet once said diaphragm valve member is not in the sealing position, said pilot valve-operated diaphragm valve means selectively opening and closing said air outlet, the air pressure within said upper chamber (b) being used to open and close said diaphragm valve means, and float means within said upper chamber (b) operatively connected to said pilot valve pin, said float means rising and falling as the water level in said upper chamber (b) rises and falls such that when said float means reaches a first predetermined lower position said pilot valve pin no longer allows communication between said chamber and said upper chamber (b), when said float means reaches a second predetermined lower position said pilot valve pin causes said diaphragm valve to open and vent air through said air outlet, via from a said central aperture of said rigid valve seat member to said air outlet, said upper passageway or indentation in the upper portion of said pilot valve pin being in a position which allows communication between said chamber and said air outlet, said upper passageway or indentation in the upper portion of said pilot valve pin being in a position which allows communication between said chamber and said air outlet, and when said float means reaches a predetermined upper position said pilot valve pin causes said diaphragm valve to close by allowing passage of air from said housing to said chamber located above said diaphragm said valve means, which returns to said sealing position, said diaphragm valve member being in sealing engagement with said rigid seat member whenever said float means is in its up sealing position or the air pressure in said chamber is equal to or greater than the air pressure in said cavity.

2. The gas-liquid vortex separator-eliminator as claimed in claim 1 wherein said horizontal separating wall (d) is concavely shaped in the direction toward lower chamber (c).

3. The gas-liquid vortex separator-eliminator as claimed in claim 1 wherein said gas is air and said liquid is water.

4. The gas-liquid vortex separator-eliminator as claimed in claim 1 further comprising float guide means to guide said float along a substantially straight path of travel.

5. The gas-liquid vortex separator-eliminator as claimed in claim 4 wherein said pilot valve allows passage of air from said upper chamber (b) to a chamber on one side of said diaphragm valve means to close same when said float means reaches a predetermined upper position, and wherein said passageway in said pilot valve pin is a slot.

6. The gas-liquid vortex separator-eliminator as claimed in claim 5 wherein said pilot valve vents said chamber to atmosphere, when said float means reaches a predetermined lower position, thereby allowing the internal air pressure in said upper chamber (b) to open said diaphragm valve means.

7. The gas-liquid vortex separator-eliminator as claimed in claim 6 wherein said pilot valve vents said chamber to atmosphere when said float means reaches a predetermined lower position, thereby allowing the internal air pressure in said upper chamber (b) to open said diaphragm valve means.

8. The gas-liquid vortex separator-eliminator as claimed in claim 7 wherein said diaphragm valve means is affixed between a retainer and a valve seat structure having a valve seat which is contacted by diaphragm valve when it is in closed position.

9. A gas-liquid vortex separator-eliminator which is adapted to be connected in a closed liquid circulating system having supply and return lines including a circulating pump connected therein for circulating liquid in said circulating system, comprising (a) an upright main body which has an upper chamber (b) and a lower chamber (c), said upper chamber (b) and lower chamber (c) being separated by a horizontal wall (d) that has a gas discharge part (e) in the center thereof, (f) an inlet which has a horizontal axis which generally perpendicularly intersects the vertical axis of said upright main body (a), said inlet (f) said lower chamber (c), said integral diffuser (g) positioned immediately inside of said lower chamber (c), said integral diffuser (g) being affixed at a horizontal angle and a vertical angle to said horizontal axis of said inlet (f), (h) an outlet, which has a horizontal axis which is generally aligned on said horizontal axis of said inlet (d) and which generally perpendicularly intersects said vertical axis of said upright main body (a), said outlet (h) having a vertical pipe leg (i) positioned inside of said lower chamber (c) so that the lower segment thereof is positioned in the lower portion of lower chamber (c) and that the vertical axis of said lower segment of said vertical pipe leg (i) is generally aligned in said vertical axis of said upright main body (a), and (j) a gas vent-eliminator positioned within said upper chamber (b), when said separator-eliminator is in operation, said liquid enters said inlet (f), is directed into said lower chamber (c) and exits via said vertical pipe leg (i) and said outlet (h), said horizontal angle and said vertical angle being of sufficient degree from the vertical axis of the outlet to force said water tangentially against the side of said lower chamber (c) and downwardly in said lower chamber (c), respectively, so as to form a water vortex in said lower chamber whereby the gas in said liquid is released in the form of bubbles, said liquid being present during operation in said upper chamber (b) and said lower chamber (c), the lower end of said vertical pipe leg (i) being below where said bubbles form and/or where gas bubbles entrained in said liquid are carried down to by said vortex, said horizontal separating wall (d) being positioned in said upright main body (a) at a level to prevent the tangential fluid motion in said lower chamber (c) from interfering with the passage of gas bubbles up into said upper chamber (b), the gas bubbles rising into said upper chamber (b) and being purged into the atmosphere by means of said gas vent-eliminator within said upper chamber (b), said gas vent-elimintor (j) for automatically venting entrapped gas from a liquid system having a pilot valve-operated diaphragm valve means comprising a valve seat structure containing an upwardly facing rigid valve seat member having a central aperture communicating with the interior of said upper chamber (b), a pilot valve-operated flexible diaphragm valve member having a sealing surface which faces downward and sealing engages against said rigid valve seat member, said diaphragm valve member having a central aperture, a chamber located above said flexible diaphragm member, on the side of said flexible diaphragm member opposite said sealing surface, said chamber communicating with said central aperture of said diaphragm valve member, a retaining means to position and retain said flexible diaphragm member in said valve seat structure such that said sealing surface on said flexible diaphragm member is in contact with said rigid valve seat member said retaining means having a central aperture which is aligned with and communicates with said central aperture of diaphragm valve member, and a pilot valve slidably located in said central aperture of said diaphragm valve member, at least one passageway being located in the lower portion of said pilot valve pin, said lower passageway allowing communication between said cavity in said upper chamber (b) and said central aperture in said diaphragm valve member when said diaphragm valve member sealingly engages said valve seat member and not being in such communication position once said lower passageway has moved entirely within said central aperture of said diaphragm valve member or when such sealing engagement does not exist, said pilot valve pin allowing communication between said chamber and said air outlet when said sealing engagement does not exist, at least one passageway or indentation being located in the upper portion of said pilot valve pin, said upper passageway or indentation allowing communication between said chamber and said air outlet once said diaphragm valve member is not in the sealing position, said pilot valve-operated diaphragm valve means selectively opening and closing said air outlet, the air pressure within said upper chamber (b) being used to open and close said diaphragm valve means, and float means within said upper chamber (b) operatively connected to said pilot valve pin, said float means rising and falling as the water level in said upper chamber (b) rises and falls such that when said float means reaches a first predetermined lower position said pilot valve pin no longer allows communication between said chamber and said upper chamber (b), when said float means reaches a second predetermined lower position said pilot valve pin causes said diaphragm valve to open and vent air through said air outlet, via a passageway from said central aperture of said rigid valve seat member to said air outlet, said upper pilot valve pin being in a position which allows communication between said chamber and said air outlet, and when said float means reaches a predetermined upper position said pilot valve pin causes said diaphragm valve to close by allowing passage of air from said housing to said chamber located above said diaphragm valve means, which returns to said sealing position, said diaphragm valve member being in sealing engagement with said rigid valve seat member whenever said float means is in its up sealing position or the air pressure in said chamber is equal to or greater than the air pressure in said cavity.

10. The gas-liquid vortex separator-eliminator as claimed in claim 9 further comprising float guide means to guide said float along a substantially straight path of travel.

11. The gas-liquid vortex separator-eliminator as claimed in claim 10 wherein said pilot valve allows passage of air from said upper chamber (b) to a chamber on one side of said diaphragm valve means to close same when said float means reaches a predetermined upper position, and wherein said passageway in said pilot valve pin is a slot.

12. The gas-liquid vortex separator-eliminator as claimed in claim 11 wherein said pilot valve vents said chamber to atmosphere, when said float means reaches a predetermined lower position, thereby allowing the internal air pressure in said upper chamber (b) to open said diaphragm valve means.

13. A gas-liquid vortex separator-eliminator as claimed in claim 12 wherein said pilot valve vents said chamber to atmosphere when said float means reaches a predetermined lower position, thereby allowing the internal air pressure in said upper chamber (b) to open said diaphragm valve means.

14. The gas-liquid vortex separator-eliminator as claimed in claim 13 wherein said diaphragm valve means is affixed between a retainer and valve seat structure having a valve seat which is contacted by said diaphragm valve when in its closed position.

15. The gas-liquid vortex separator-eliminator as claimed in claim 9 wherein said horizontal separating wall (d) is concavely shaped in the direction toward lower chamber (c).

16. The gas-liquid vortex separator-eliminator as claimed in claim 9 wherein said short pipe leg (g) of said inlet (f) is affixed at a horizontal angle of about 30 degrees to said horizontal axis of said inlet (f) and at about a vertical angle of about 15 degrees to said horizontal axis of said inlet (f).

17. The gas-liquid vortex separator-eliminator as claimed in claim 9 wherein said gas is air and said liquid is water.

* * * * *